(12) United States Patent
Wang

(10) Patent No.: US 8,634,776 B2
(45) Date of Patent: Jan. 21, 2014

(54) COMMUNICATION TERMINAL AND PAIRING METHOD THEREOF

(75) Inventor: Peng Wang, Shenzhen (CN)

(73) Assignees: Fu Tai Hua Industry (Shenzhen) Co. Ltd., Shenzhen (TW); Hon Hai Precision Industry Co., Ltd., New Taipei (TW)

( * ) Notice: Subject to any disclaimer, the term of this patent is extended or adjusted under 35 U.S.C. 154(b) by 167 days.

(21) Appl. No.: 13/192,360

(22) Filed: Jul. 27, 2011

(65) Prior Publication Data

US 2012/0309313 A1 Dec. 6, 2012

(30) Foreign Application Priority Data

Jun. 3, 2011 (CN) .......................... 2011 1 0149096

(51) Int. Cl.
*H04B 7/00* (2006.01)
(52) U.S. Cl.
USPC .. 455/41.2; 455/67.7; 455/67.11; 340/539.32
(58) Field of Classification Search
USPC ................ 455/41.1, 41.2, 67.7, 67.11, 550.1, 455/556.1; 340/539.32
See application file for complete search history.

(56) References Cited

U.S. PATENT DOCUMENTS

| 8,182,420 B2* | 5/2012 | Homan et al. ................. 600/160 |
| 2011/0210849 A1* | 9/2011 | Howard et al. ........... 340/539.32 |
| 2011/0316847 A1* | 12/2011 | Cheng ............................ 345/419 |

* cited by examiner

*Primary Examiner* — Tuan H Nguyen
(74) *Attorney, Agent, or Firm* — Altis Law Group, Inc.

(57) ABSTRACT

A communication terminal includes a request unit, an illuminating unit, a detecting unit, a capturing unit, an analyzing unit, and a pairing unit. The request unit is used for generating a pairing signal when communication pairing function is enabled. The illuminating unit is used for generating predetermined light when communication pairing function is enabled. The detecting unit detects whether the pairing signal from another terminal has been received, and if it has, generates a signal to the capturing unit. The capturing unit is used for capturing an image of the light generated by the illuminating unit of the other terminal. The analyzing unit is used for analyzing the captured image. The pairing unit is used for completing the communication pairing with the other terminal when the captured image of the light includes a predetermined characteristic.

8 Claims, 3 Drawing Sheets

COMMUNICATION TERMINAL AND PAIRING METHOD THEREOF

BACKGROUND

1. Technical Field

The present disclosure relates to communication technologies; and particularly to a pairing method used by a communication terminal.

2. Description of Related Art

Two BLUETOOTH enabled cell phones may communicate with each other after achieving a BLUETOOTH pairing. However, the BLUETOOTH pairing needs the users of the two cell phones to input the same password. This is inconvenient.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the three views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
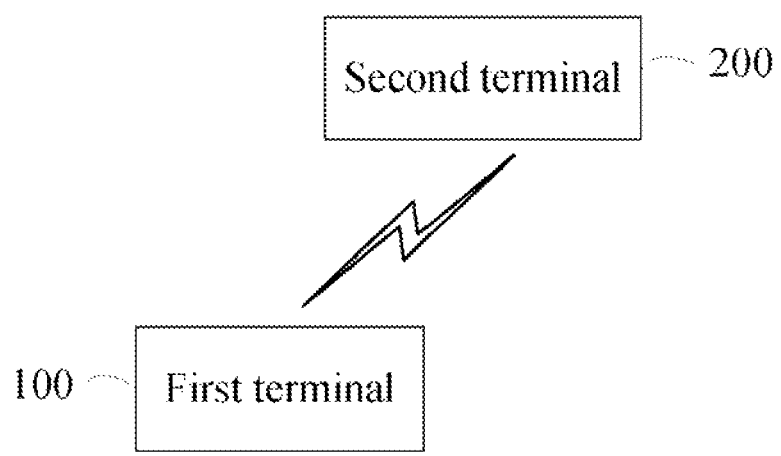
FIG. 1 is a block diagram of a communication system in accordance with an embodiment; and the communication system includes two communication terminals.
Figure 2:
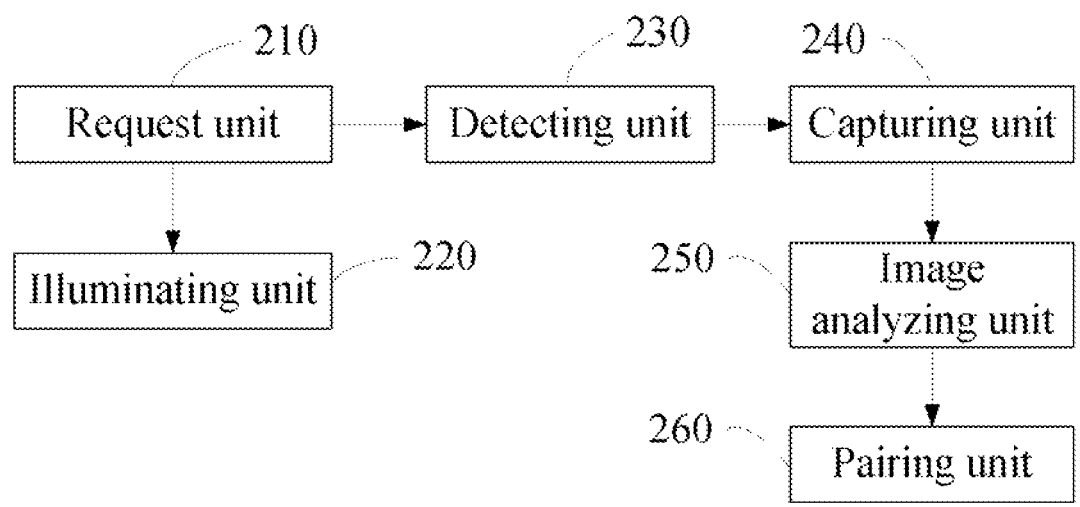
FIG. 2 is a block diagram of the communication terminal of FIG. 1 in accordance with an embodiment.

Referring to FIGS. 1 and 2, a communication system 99 includes two communication terminals: a first terminal 100 and a second terminal 200. Each of the first and second terminals 100, 200 includes a request unit 210, an illuminating unit 220, a detecting unit 230, a capturing unit 240, an image analyzing unit 250, and a pairing unit 260. In the embodiment, the first and second terminals 100, 200 are cell phones; and the communication technology employed by the two communication terminals 100, 200 is a wireless technology such as BLUETOOTH.

The request unit 210 is used for generating a pairing signal when the communication pairing function of the communication terminal 100/200 is enabled. In the embodiment, a user can select an item(s) from a menu (s) displayed by the terminal 100/200, or press a key(s) disposed on the housing (not shown) of the terminal 100/200 to enable the communication pairing function. In the embodiment, the communication pairing protocol is BLUETOOTH pairing.

The illuminating unit 220 is disposed outside of the housing of the terminal 100/200, and emits light of a predetermined color when the communication pairing function of the communication terminal 100/200 is enabled. In the embodiment, the illuminating unit 220 is a light-emitting diode (LED), and the predetermined color may be blue or green or another color.

The detecting unit 230 is used for detecting whether the pairing signal generated by the request unit 210 of another terminal has been received, and if so to generate a capturing signal.

The capturing unit 240 is used for capturing an image of the light emitted by the illuminating unit 220 of the other terminal in response to the capturing signal, and transmitting the captured image to the image analyzing unit 250. The image analyzing unit 250 is used for analyzing the captured image to establish the colors within the captured image.

The pairing unit 260 is used for determining whether the colors within the captured image include the predetermined color, and completing the communication pairing with the other terminal when the colors within the captured image include the predetermined color.

Using the first and second terminals 100, 200 as an example, a pairing process between the two communication terminals would proceed as follows. Communication pairing function of the two terminals 100, 200 having been enabled, the two terminals 100, 200 respectively transmit a pairing signal, and meanwhile the illuminating unit 220 of the two terminals 100, 200 emits light of the predetermined color. The detecting unit 230 of one of the two terminals 100, 200 detects whether a pairing signal transmitted by the other terminal has been received. When one of the two terminals 100, 200 (such as the first terminal 100) receives the pairing signal transmitted by the other terminal (such as the second terminal 200), the capturing unit 240 of the one of the two terminals 100, 200 captures an image of the light emitted by the illuminating unit 220 of the other terminal, and the image analyzing unit 250 analyzes the captured image to establish the colors within the captured image, and the pairing unit 260 completes the communication pairing between the terminals 100, 200 when the colors within the captured image include the predetermined color.

Using the communication system 99, the first terminal 100 and the second terminal 200 only need to detect the pairing signal and the predetermined color of light in the captured image to complete the communication pairing, the user need not input any password, this is a far more convenient procedure.

The color of the light emitted is used as the significant factor in the embodiment, but in other embodiments the light being emitted by the illuminating unit 220 in a predetermined shape or pattern or with some other predetermined characteristic may be taken as the significant factor.

Figure 3:
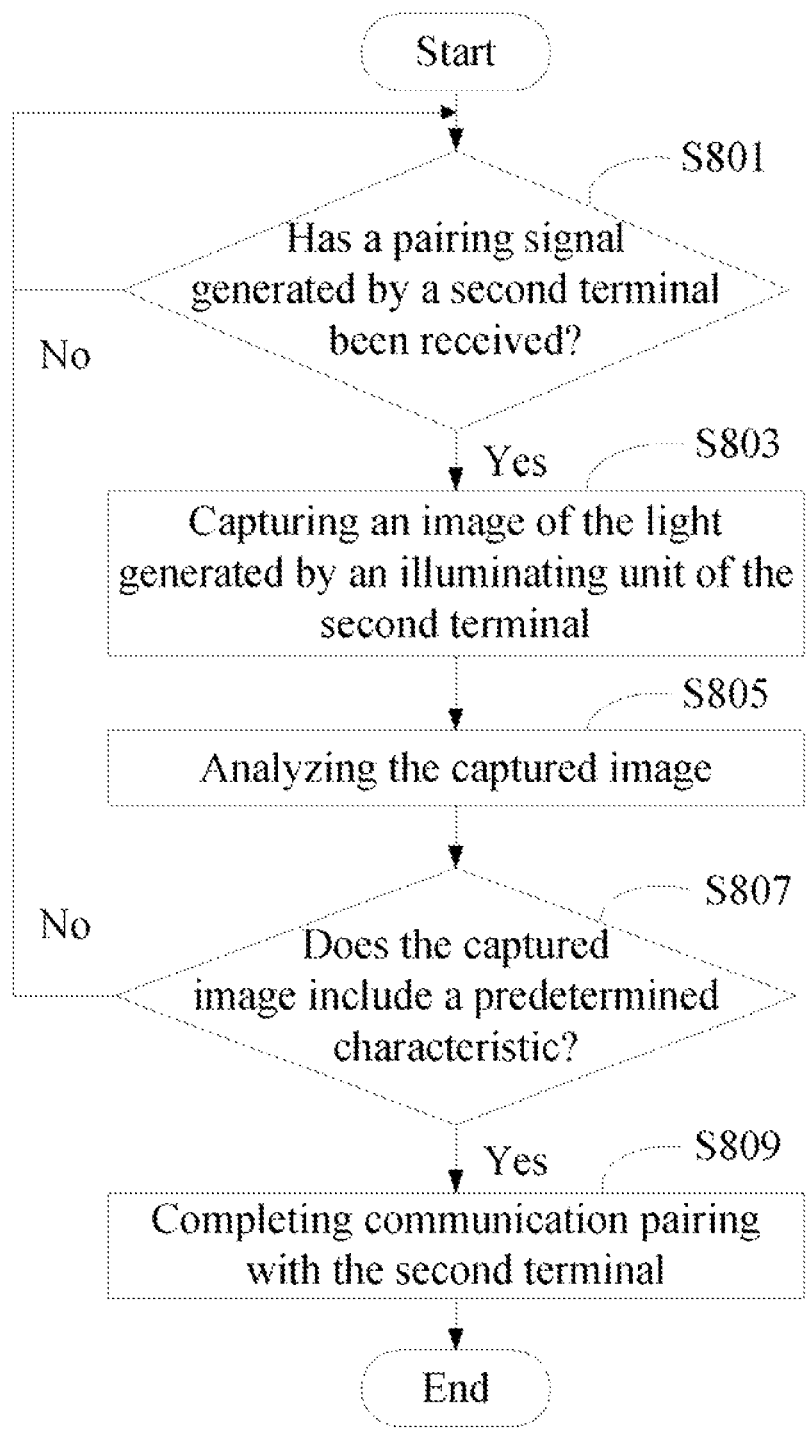
FIG. 3 is a flowchart of a pairing method in accordance with an embodiment.

Referring to FIG. 3, a pairing method used in a communication system is provided. The communication system includes a first terminal and a second terminal Each of the first and second terminals includes a request unit and an illuminating unit. The request unit is used for generating a pairing signal when the communication pairing function of the communication terminal is enabled. The illuminating unit is used for emitting light of a predetermined color when the communication pairing function of the communication terminal has been enabled. In the embodiment, the first and second terminals are cell phones, the communication technology employed by the first and second terminals is a wireless technology such as BLUETOOTH, the communication pairing protocol is the BLUETOOTH pairing. The pairing method includes following steps.

In step S801, the first terminal determines whether a pairing signal has been received. If the first terminal has received the pairing signal generated by the second terminal, step S803 is implemented. If no pairing signal has been received, step S801 is repeated.

In step S803, the first terminal captures an image of the light generated by an illuminating unit of the second terminal.

In step S805, the first terminal analyzes the captured image.

In step S807, the first terminal determines whether the captured image includes a predetermined characteristic. If the captured image include the predetermined characteristic, step S809 is implemented. If the captured image does not include the predetermined characteristic, step S801 is implemented. The predetermined characteristic of the light may be a predetermined color, a predetermined shape, or a predetermined pattern.

In step S809, the first terminal completes the communication pairing with the second terminal As such, the first terminal only needs to detect the pairing signal and the predetermined characteristic of the light transmitted by the second terminal in the captured image to complete the communication pairing, the user need not input any password.

Although the information and advantages of the present embodiments have been set forth in the foregoing description, together with details of the structures and functions of the present embodiments, the disclosure is illustrative only; and changes may be made in detail, especially in matters of shape, size, and the arrangement of parts within the principles of the present embodiments to the full extent indicated by the broad general meaning of the terms in which the appended claims are expressed.

What is claimed is:

1. A communication terminal, comprising:
 a request unit generating a pairing signal when the communication pairing function is enabled;
 an illuminating unit emitting predetermined light when the communication pairing function is enabled;
 a detecting unit determining whether the pairing signal generated by the request unit of another terminal is received, and generating a capturing signal when the pairing signal generated by the request unit of the other terminal is received;
 a capturing unit capturing an image of the light emitted by the illuminating unit of the other terminal in response to the capturing signal;
 an analyzing unit analyzing the captured image; and
 a pairing unit determining whether the captured image comprises a predetermined characteristic, and completing the communication pairing with the other terminal to establish a communication link between the communication terminal and the other terminal when the captured image comprises the predetermined characteristic.

2. The communication terminal according to claim 1, wherein the predetermined characteristic is determined by the predetermined light; and the predetermined characteristic is one of color, shape and pattern of the light.

3. The communication terminal according to claim 1, wherein the communication pairing is BLUETOOTH pairing.

4. The communication terminal according to claim 1, wherein the illuminating unit is a light-emitting diode.

5. A pairing method used by a communication terminal which comprises a request unit and an illuminating unit; the request unit generating a pairing signal when the communication pairing function of the communication terminal is enabled; and the illuminating unit emitting predetermined light when the communication pairing function of the communication terminal is enabled; the pairing method comprising:
 determining whether a pairing signal generated by another terminal has been received;
 when the pairing signal generated by the other terminal has been received, capturing an image of the light generated by an illuminating unit of the other terminal;
 analyzing the captured image; and
 determining whether the captured image comprises a predetermined characteristic; and
 when the captured image comprises the predetermined characteristic, completing the communication pairing with the other terminal to establish a communication link between the communication terminal and the other terminal.

6. The pairing method according to claim 5, wherein the predetermined characteristic is determined by the predetermined light; and the predetermined characteristic is one of color, shape and pattern of the light.

7. The pairing method according to claim 5, further comprising:
 when no pairing signal has been received, the step of determining whether the pairing signal generated by the other terminal has been received is implemented.

8. The pairing method according to claim 5, further comprising:
 when the captured image does not comprises the predetermined characteristic, the step of determining whether the pairing signal generated by the other terminal has been received is implemented.

* * * * *